United States Patent
Kobayashi

(10) Patent No.: US 7,421,193 B2
(45) Date of Patent: Sep. 2, 2008

(54) DIGITAL MOTOR CONTROL SYSTEM AND METHOD

(76) Inventor: Herbert S. Kobayashi, 1428 Nasa Pkwy., Webster, TX (US) 77598

( * ) Notice: Subject to any disclaimer, the term of this patent is extended or adjusted under 35 U.S.C. 154(b) by 417 days.

(21) Appl. No.: 11/168,791

(22) Filed: Jun. 28, 2005

(65) Prior Publication Data

US 2006/0291820 A1 Dec. 28, 2006

(51) Int. Cl.
H02P 7/29 (2006.01)
(52) U.S. Cl. .................. 388/811; 388/814; 318/254; 318/599; 318/696
(58) Field of Classification Search ............... 388/811; 318/139, 254, 280–286, 599, 603, 696, 685
See application file for complete search history.

(56) References Cited

U.S. PATENT DOCUMENTS

| | | | | |
|---|---|---|---|---|
| 3,206,665 A | * | 9/1965 | Burlingham | 388/814 |
| 3,612,974 A | * | 10/1971 | Wolf et al. | 318/254 |
| 3,766,459 A | * | 10/1973 | McIntosh et al. | 318/603 |
| 3,858,100 A | * | 12/1974 | Bussi et al. | 388/814 |
| 3,898,545 A | * | 8/1975 | Coppa et al. | 388/811 |
| 3,942,084 A | | 3/1976 | Louth | |
| 4,008,424 A | * | 2/1977 | Bompani | 318/293 |
| 4,011,487 A | * | 3/1977 | Loomis | 318/138 |
| 4,100,012 A | | 7/1978 | Meihofer et al. | |
| 4,145,644 A | * | 3/1979 | Liu | 318/696 |
| 4,205,260 A | * | 5/1980 | Maeda et al. | 318/257 |
| 4,295,082 A | * | 10/1981 | Moto et al. | 318/599 |
| 4,409,529 A | * | 10/1983 | Basford et al. | 318/653 |
| 4,651,269 A | * | 3/1987 | Matsumura | 363/63 |
| 4,693,583 A | * | 9/1987 | Ogihara et al. | 396/256 |
| 4,703,244 A | * | 10/1987 | Takeuchi et al. | 318/696 |
| 5,334,924 A | | 8/1994 | Kawada et al. | |
| 5,729,067 A | | 3/1998 | Janutka | |
| 6,018,200 A | | 1/2000 | Anderson et al. | |
| 6,051,943 A | | 4/2000 | Rabin et al. | |
| 6,058,081 A | | 5/2000 | Schell et al. | |
| 6,064,172 A | | 5/2000 | Kuznetsov | |
| 6,069,857 A | | 5/2000 | Schell et al. | |
| 2006/0291820 A1 | * | 12/2006 | Kobayashi | 388/811 |

OTHER PUBLICATIONS

PCT International Search Report and Written Opinion, mailed Dec. 12, 2007, for international application No. PCT/US06/22569.

* cited by examiner

*Primary Examiner*—Paul Ip
(74) *Attorney, Agent, or Firm*—Kenneth L. Nash

(57) ABSTRACT

A digital motor control system utilizes time duration electric pulses generated by digital logic to control the motor speed and direction of rotation of a D.C. or A.C. motor. The digital logic produces width modulated pulses that can be connected to large or small electric motors by mechanical or electrical relays or switches to provide efficient motor control with little control circuit power loss. The mechanical or electrical switches are responsive to the digital logic to change motor direction or remove power from the motor windings. A variable control element such as a computer joystick can be utilized to control both direction and speed of the motor. The system can be configured as an open loop system or as a closed loop servo with a feed back element to control the rotational position of the motor.

21 Claims, 6 Drawing Sheets

DIGITAL MOTOR CONTROL SYSTEM AND METHOD

BACKGROUND OF THE INVENTION

1. Field of the Invention

The present invention relates generally to motor control systems and, more particularly, to a pulse width modulation digital motor control system to control both the motor speed and direction of rotation for D.C. or A.C. electric motors.

2. Description of the Background

Prior art servo control systems often either do not provide motor rotation direction control or have problems related to changing the motor rotation direction. The speed of a servo motor and its direction of rotation are conventionally controlled in a linear or analog servo loop as shown in FIG. 1 by controlling the amplitude and polarity of a signal applied to a power transistor included in the loop. However, depending on operation demands, the power transistor may dissipate a lot of power thereby making the system more expensive and less efficient. Inefficiencies in this system are especially large around the null error signal level, i.e., where the motor is at the null between forward and reverse directions. For example, the loss of power for a 12 volt D.C. motor drawing two amperes of current could be approximately 24 watts around null in the power stage of the system shown in FIG. 1. For a servo power control system to operate reliably without failure, the system design should always consider the power dissipation which is a significant factor and also the flexibility of the design in allowing its application to large and small motors. This may be especially important in applications where the available power may be limited.

Motor control has also been provided in non-linear servo loops such as in the servo loop shown in FIG. 2. In this system, the servo loop utilizes an error signal to induce full forward or reverse motor rotation. However, stabilization is difficult because there is no continuous error signal provided at the null position. Instead there is a dead space.

Open loop motor speed control systems have used variations of the time durations of pulses applied to the motor due to their efficient use of power especially useful for battery operated devices. An example is in application to a variable speed drill, screwdriver, or socket driver wherein a mechanical switch is used to control motor direction. The inconvenience in having to mechanically change motor direction is normally acceptable, although it would be desirable for some workers who have only one hand for operation to be able to change motor direction without manually operating a switch.

Moreover, when this type of system is used in a closed loop servo system, the motor must typically be able to reverse automatically, not by a mechanical switch, because the motor could turn forward or reverse many times a second, especially around null and especially in a closed loop system around the null. Therefore, the pulse width variation type of control is not readily adaptable to stable operation of closed loop servo systems.

U.S. Pat. No. 3,942,084, issued Mar. 2, 1976, to Louth, discloses a motor drive and servo systems particularly useful in high quality broadcast video tape recorders. A sine/cosine drive for a brushless DC motor permits high motor efficiency in a system adapted for use in a servo loop. A technique for phase locking a pair of frequency related phase locked control variable signals to a pair of frequency related reference signals, horizontal and vertical sync signals, for example, provides the advantages and precision of closed loop correction at widely variable correction rates. More accurate tape shuttling in a VTR is provided by running a DC motor in a phase locked loop as a synchronous motor and more accurate stopping of the tape is provided by comparing the capstan speed to ground in a closed loop. Improved tape tension control in the head area is provided by a pair of vacuum columns controlled by an error signal derived from the peak-to-peak tension error.

U.S. Pat. No. 4,100,012, issued Jul. 11, 1978, to Meihofer et al, discloses a web splicing apparatus that employs a pair of driven nip rolls which controllably feed web from a running roll into a festoon as web is drawn out of the festoon at a constant rate by a downstream web consuming machine. The nip rolls are driven by a DC motor connected in a closed loop servo system which compares the speed of the web entering the festoon with the web line speed to develop a command signal for the motor. During normal operation, the command signal includes a web velocity trim signal developed by monitoring the position of the festoon dancer relative to a selected reference position so as to minimize tension upsets and to maintain the dancer within its control range. During a splice sequence, the command signal comprises a deceleration ramp having a selected slope to provide controlled deceleration of the web to minimize tension upsets and to permit actuation of the splicing nips prior to actual web stop. After the splice is made, the command signal comprises an acceleration ramp whose slope is automatically adjusted to apply the least necessary tension to the ready web for new roll acceleration consistent with a given splicing speed. Further with this arrangement, the gain of the system is independent of the changing size of the expiring roll.

U.S. Pat. No. 5,334,924, issued Aug. 2, 1994, to Kawada et al, discloses that speed control of an induction motor is effected in digital fashion through use of a computer but without complex processing, and with a computer that need not be large in scale. This is accomplished by processing at least a speed command signal, actual speed signal and torque signal in analog fashion, enabling simplification of an induction motor speed control digital processing section which performs all other control operations in a digital manner. In a speed control network having a closed loop, a frequency-to-voltage converter, adder-subtractor, proportional integrator, polarity determining circuit absolute value circuit and voltage-to-frequency converter are constructed of circuitry operable on the basis of analog values, with all other circuits being constructed of circuitry operable on the basis of digital values.

U.S. Pat. No. 5,729,067, issued Mar. 17, 1998, to Janutka, discloses an improved method and servo control apparatus for controlling the motion of a linear electric motor which in turn generates motion command signals to various apparatus such as a hydraulic steering system. Preferably, the servo control apparatus includes a power supply circuit, a servo amplifier circuit, a pulse width modulation circuit, an H-bridge drive circuit and an inductive position sense circuit. The voltage at a node between coil pairs in the motor is sensed and synchronously demodulated using transmission gates to develop a DC signal representative of armature position from a center location. The signal on a current shunt resistor is synchronously demodulated by transmission gates to generate a signal, the phase of which is determined with respect to the motor drive signal. The phase signal directly indicates whether the armature is off center towards drive coil or drive coil.

U.S. Pat. No. 6,018,200, issued Jan. 25, 2000, to Anderson et al, discloses the throttle of an engine in an engine driven generator system operating subject to a wide and rapidly variable load, as in supplying current to a welder, is operated such that control signals are sent to a throttle actuator for adjusting the engine throttle position in response to load changes. The throttle actuator may be a solenoid pulling against a spring in accordance with the average current through the solenoid coil. In this embodiment, the processor causes pulse width modulated signals to be applied across the solenoid coil with throttle position changes being reflected in changes to the width of the pulses, such changes in the pulse width being delayed for at least the predetermined time since the last preceding adjustment to the throttle. Alternatively, the throttle actuator may be a stepper motor which is stepped by throttle position change signals from a processor which monitors engine speed and generator load to determine whether the throttle should be adjusted and, if so, in which direction and to what extent for optimum response.

U.S. Pat. No. 6,051,943, issued Apr. 18, 2000, to Rabin et al, discloses a motor control system employing a single Hall sensor providing a position feedback signal to a control circuit. The control circuit includes a tach counter circuit, a ramp mode circuit, an interpolation circuit, and a commutation logic circuit. Drive signals are output to the motor windings by the commutation logic circuit. The control state defining the drive signals is advanced on the basis of the estimated rotor position. The estimate of the rotor position is determined by linearly interpolating between Hall signal transitions.

U.S. Pat. No. 6,058,081, issued May 2, 2000, to Schell et al, discloses an optical drive system that includes an objective lens subassembly for directing light from a light source toward an information storage medium. An amount of the directed lighted light is returned from the storage medium. An objective lens is disposed in the objective lens subassembly. A first servomotor moves, during focus capture, the objective lens to a first position, away from the first position toward the storage medium being read while looking for a maximum Quad Sum signal, and back away from the storage medium. An electronic control circuit is connected to the first servomotor. A servo error detector is coupled to the electronic control circuit and disposed in a path of light returning from the information storage medium. The servo error detector is implemented to determine when total light returned from the information storage medium exceeds a predetermined value, to search for a first zero crossing, corresponding to when the Quad Sum signal exceeds a predetermined amplitude, and to indicate to the electronic control circuit to direct close of focus when the Quad Sum signal exceeds the predetermined amplitude.

U.S. Pat. No. 6,064,172, issued May 16, 2000, to Kuznetsov, discloses a winding fault detection system that provides classification and identification of winding faults or winding malfunctions. The fault detection system provides signals to individual electronic switches for segmented primary windings each having an electrical phase and grouped into sub-phases which are individually switch into or out of an excitation supply or isolated through the electronic switching in response to signals from the winding fault detection system. Each primary winding forms an electrical member which includes a stator having a poly-phase winding, and there is a secondary electrical member magnetically coupled with the stator. Each primary has magnetic field sensors which detect phase angle and magnitudes of radial components of air gap flux by magnetic measurement probes between each secondary electrical member and each primary electrical member and derives an electrical signal for a component of air gap flux contributing to electromagnetic torque at each position of each stator's periphery. Additionally, the system instantaneously stores data continuously derived from the magnetic sensors and determines a hierarchy of fault detection schemes.

U.S. Pat. No. 6,069,857, issued May 30, 2000, to Schell et al, discloses an optical disc drive system that is employed in conjunction with a storage medium having a plurality of data sectors each provided with a header and a data storage area. The system includes a data detection device for retrieving stored data from the storage medium and outputting a data signal, an amplifier for providing a variable gain to the data signal and outputting an amplified data signal, a detector that is responsive to the amplified data signal for evaluating a predetermined one of the sectors to ascertain whether the storage area is blank, and an automatic gain control circuit producing a gain control output for controlling the gain of the amplifier. The control circuit has a first mode and a second mode, the first mode being active during retrieval of the header and the second mode being active during retrieval of the data storage area. The system is further provided with a sampling device for sampling the gain control output during retrieval of the stored data in a respective one of the storage areas containing previously stored data. The sampling device outputs results of the sampling, and a fixed gain control circuit is responsive to the results of the sampling for outputting a fixed gain control signal. The fixed gain control signal is applied to the amplifier during evaluation of the predetermined one of the sectors.

It would be desirable to provide a low power dissipation control system without the disadvantages of the systems discussed above, especially at the null between reverse and forward motor directions. Consequently, there remains a long felt need for an improved motor speed and direction control system. Those skilled in the art have long sought and will appreciate the present invention which addresses these and other problems.

SUMMARY OF THE INVENTION

It is an object of the present invention to provide an improved motor control.

It is another object of the present invention to provide a stable, energy efficient, servo control system.

These and other objects, features, and advantages of the present invention will become apparent from the drawings, the descriptions given herein, and the appended claims. However, it will be understood that above-listed objectives and/or advantages of the invention are intended only as an aid in quickly understanding aspects of the invention, are not intended to limit the invention in any way, and therefore do not form a comprehensive or restrictive list of objectives, and/or features, and/or advantages.

Accordingly, the present invention provides a control system operable for controlling a direction and speed of an electric motor. The control system may comprise one or more elements such as, for instance, a clock pulse generator to produce clock pulses, and a variable duration pulse generator to produce output pulses which are synchronized with the clock pulses. Other elements may comprise a pulse duration control for controlling the variable width pulse generator to thereby vary a duration of the output pulses. A logic control which may utilize digital circuitry is operable for producing control signals which control forward and reverse rotational direction and speed of the motor in response to comparing a duration of the clock pulse and a duration of the output pulses from the pulse generator. A power switch network may be utilized for interfacing the forward motor rotation output and the reverse motor rotation output to the electric motor.

The control system may comprise an open loop control system or a closed loop control system. When utilized in a closed loop control system, the system may further comprise a shaft rotatable by the motor and variable output element responsive to a rotational position of the shaft. The variable output element provides feedback to the pulse duration control to control the rotational position of the shaft.

In one embodiment, the pulse duration control may comprise a spring-loaded joystick such that movement in one direction varies motor speed in a forward direction and movement of the joystick in the opposite direction controls motor speed in the opposite direction. The motor may be a D.C. motor or an A.C. motor.

In operation, a method is provided for controlling direction and speed of an electric motor. The method may comprise one or more steps such as, for instance, producing a clock pulse, controlling a duration of a plurality of output pulses, comparing a duration of the clock pulse with a duration of the plurality of output pulses, and/or producing control signals to control the direction and speed based on the step of comparing.

The method may further comprise producing a first direction control signal for rotation of the motor in a first rotational direction when a respective of the output pulses has a shorter duration than the clock pulse. The method may further comprise producing a second direction control signal for rotation of the motor in a second rotational direction opposite to the first rotational direction when the output pulses have a longer duration than the clock pulse.

The method may further comprise providing that the motor does not rotate when the duration of the clock pulse is equal or substantially equal to a duration of a respective of the output pulses. The method may further comprise providing that a magnitude of difference between the duration of the clock pulse and the duration of a respective of output pulses controls the motor speed. The method may further comprise applying the control signals to solid state or mechanical relays for controlling at least one of a D.C. electric motor or an A.C. electric motor.

In another possible embodiment, a control system may comprise a variable control element, and a logic control circuit operable for producing control signals which control forward and reverse rotational direction and speed of the motor, the logic control being responsive to the variable control element. Other elements may comprise an electric power supply to supply electric power to the electric motor, and a plurality of power switches changeable between a first configuration and a second configuration and a third configuration as controlled by the logic control circuit. The first configuration of the power switches connects the electric power to the one or more windings so the electric motor rotates in a forward direction. The second configuration of power switches disconnects the electric power from the one or more windings, and the third configuration of the power switches connects the electric power to the one or more windings so that the electric motor rotates in a reverse direction. Accordingly, the electric motor is responsive to changes in the variable control element to control direction of the electric motor.

The logic system is operable for controlling a rotational speed of the electric motor in the forward direction or the reverse direction by controlling a time duration in which the plurality of power switches are in the first configuration or the second configuration or the third configuration.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DETAILED DESCRIPTION OF THE PREFERRED EMBODIMENTS

The present invention provides linear motor control using pulse width modulation. In one embodiment, the error signal is a produced as a result of pulse width modulation signals applied to the motor. The present invention may utilize MOSFET and/or other solid state relay devices which provide a very low resistance during operation or in the on state. This results in low power loss, low cost, low weight, and increased efficiency of the motor speed control system.

Figure 1:
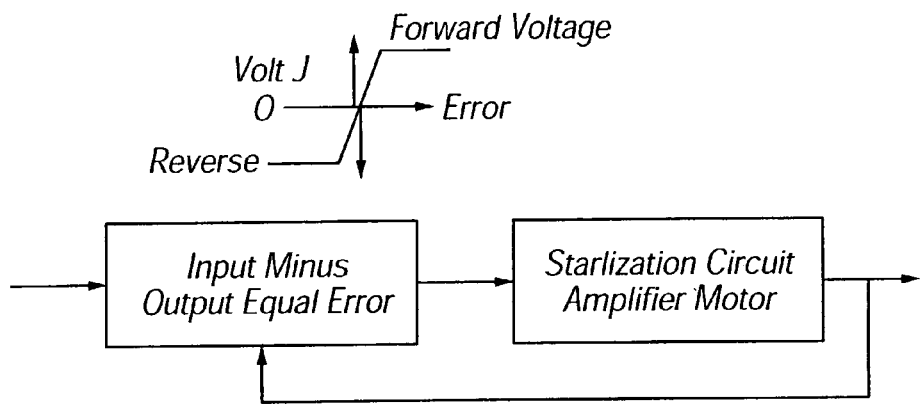
FIG. 1 is a schematic block diagram of an analog linear servo loop of the prior art wherein the motor included in the loop is controlled by the amplitude and polarity of a signal applied to the motor.
Figure 2:
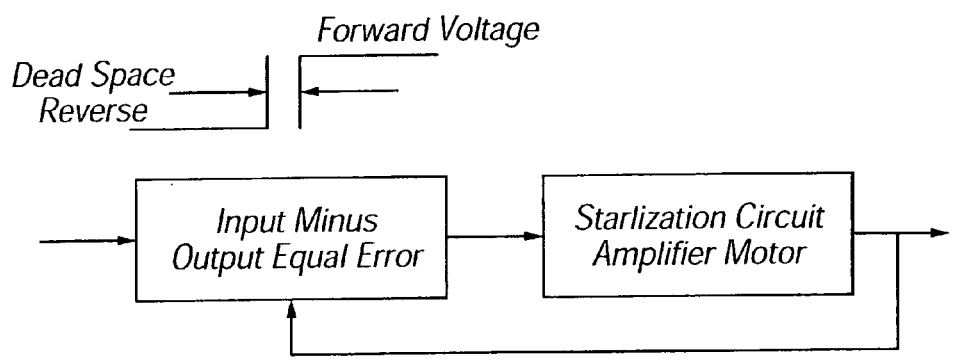
FIG. 2 is a schematic block diagram of a non-linear servo loop in the prior art which is used for controlling motor speed and direction.
Figure 3:
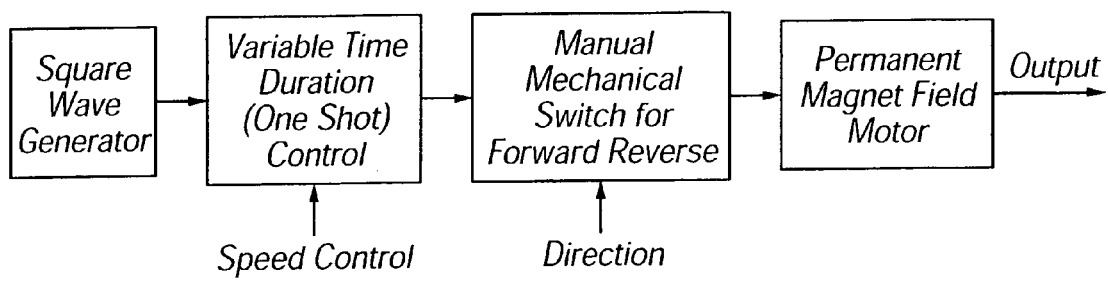
FIG. 3 is a block diagram of a system used in the prior art which incorporates a serially connected square wave generator, a one-shot multivibrator for generating a time duration signal that controls motor speed, and a mechanical switch for said signal for controlling the direction of motor rotation.
Figure 4:
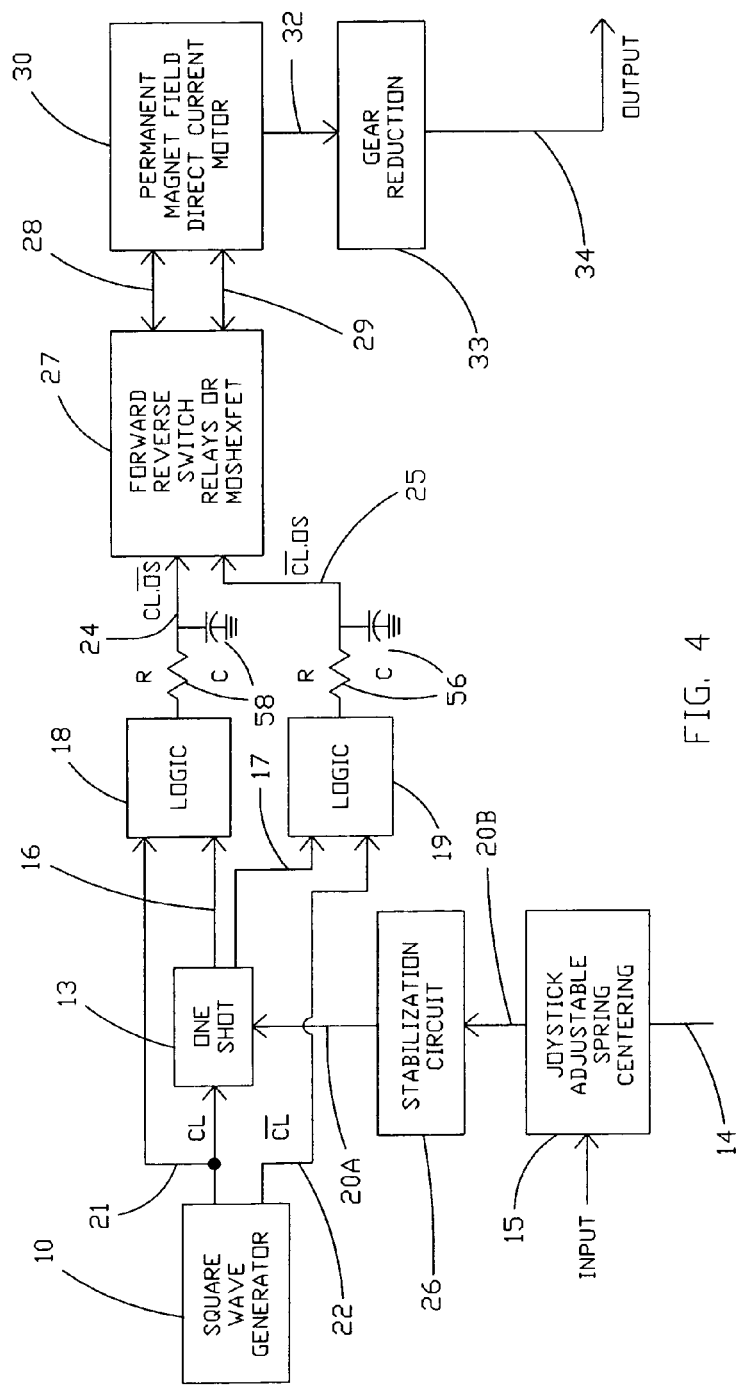
FIG. 4 is a schematic block diagram of the open servo loop embodiment of the digital motor control system of the present invention which is used to achieve digital time duration control (DTDC) of both motor speed and direction of motor rotation.

Referring now to the drawings and more particularly to FIG. 4, there is shown a block diagram of one possible embodiment of the invention with an open loop servo time duration control system and digital logic for control of the motor speed and direction of motor rotation using an analog sensor such as a variable resistance. While relatively simple logic circuits may be utilized for implementing the invention, it will be understood that the invention may also be implemented utilizing a suitably programmed microprocessor which is programmed to operate in accord with the discussion below. The general operation of most components of the open loop control system of FIG. 4 applies to the closed loop control system of FIG. 5 and therefore the discussion for those components will not be repeated with discussing FIG. 5.

Figure 6:
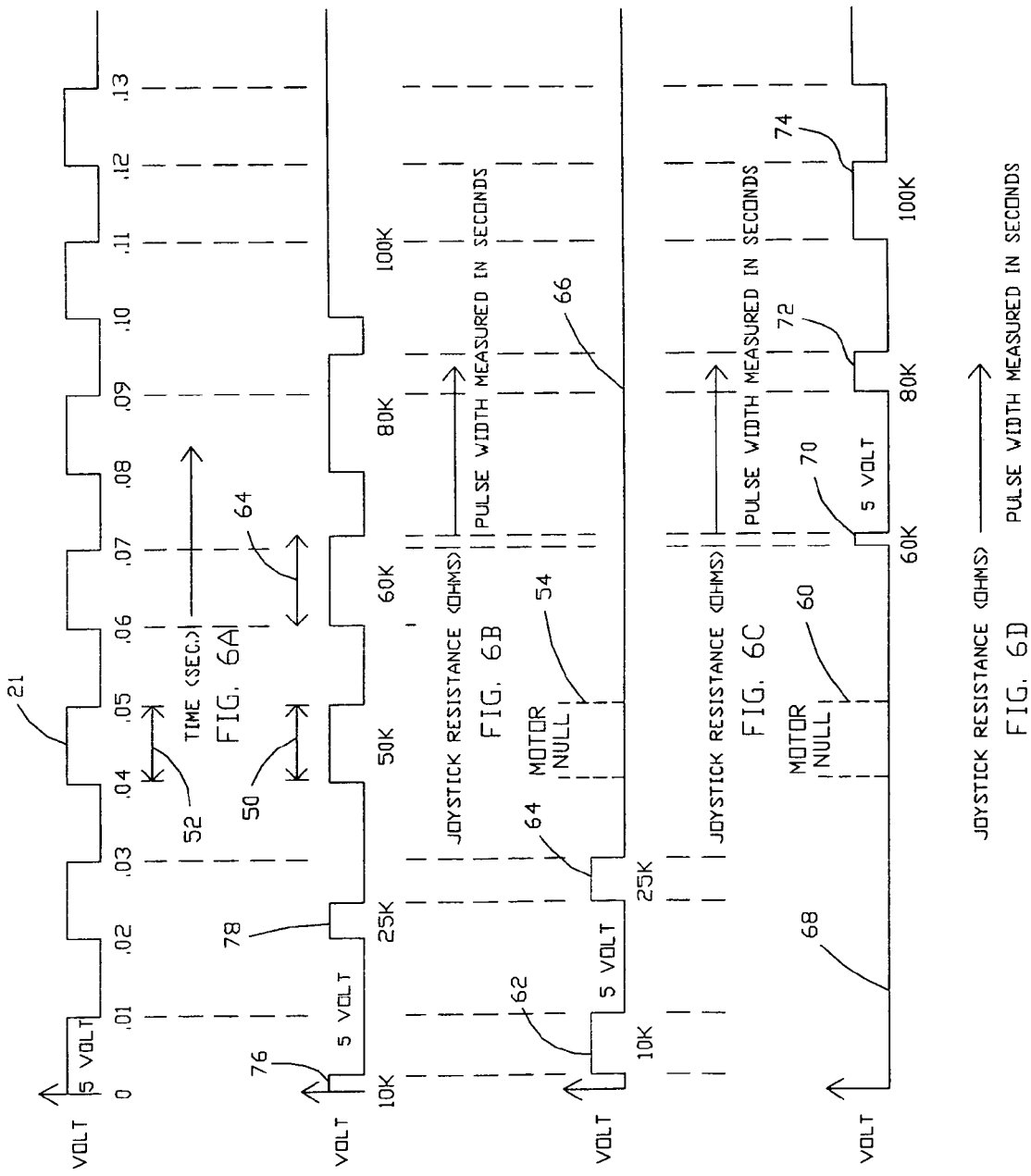
FIG. 6A is a timing diagram of the output of the square wave clock signal generator used in the embodiments of the invention shown in FIGS. 4 and 5 and in which diagram the signal amplitude is plotted versus time.
FIG. 6B is a timing diagram of signal amplitude output of the one-shot multivibrator versus a continuous increase in resistance as the one-shot multivibrator is triggered by the clock signal in the embodiments of the invention shown in FIGS. 4 and 5 and the output signal pulse duration is controlled by the joystick resistance used by the one-shot multivibrator timing circuit.
FIG. 6C is a timing diagram of signal amplitude versus resistance for the output signal from logic circuitry combining the clock and multivibrator one-shot output in the system embodiments shown in FIGS. 4 and 5 and in which diagram the resistance starts at minimum resistance and increases constantly to a maximum.
FIG. 6D is a timing diagram of signal amplitude versus resistance for the output signal from logic circuitry combining the inverted clock and multivibrator one-shot output in the system embodiments shown in FIGS. 4 and 5 and in which diagram the resistance starts at a maximum resistance and decreases constantly to a minimum.

In this example, square wave signal generator 10 is provided for generating a clock signal 21 as shown in FIG. 6A. In this example, a square wave is utilized as the clock signal, although depending on the requirements of the system other types of clock signals may be utilized. For instance, if most speed control is desired in a clockwise rotational direction as compared to the reverse rotational direction, (e.g. a car motor) the clock width may be varied to provide more control as will be appreciated after the discussion below and review of the timing diagram in FIG. 6A-FIG. 6D.

In this embodiment, clock signal 21 drives one-shot multivibrator (MV) 13. The output pulse duration of the MV 13 is controlled and can be varied by computer joystick 15. Joystick 15 may comprise a spring-centered variable resistor, or sensor resistor, or the like. The output pulse duration may be varied over a desired range, for example, from approximately 1% to 90% of the clock period. However, for the present example discussed below with forward and reverse pulses, the output pulse duration varies from zero to 50%.

Figure 4A:
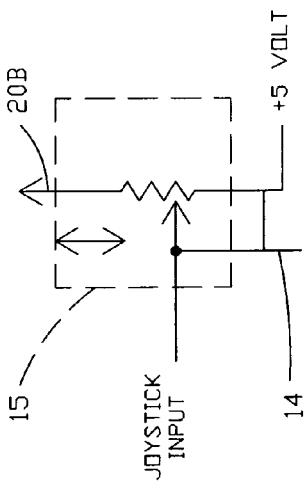

It will be appreciated that there are many ways of connecting a variable resistor or capacitor to control the pulse width output of a one-shot multivibrator such as MV 13. As shown in FIG. 4A, an input voltage of 5 volts may be applied to two terminals of the joystick resistor 14. The variable current output signal is taken from the remaining terminal for control of the pulse width output of MV 13 for typically controlling an RC timer circuit (not shown) which is part of MV 13. As will be readily appreciated, by varying the amount of current from the joystick control of FIG. 4A, caused by varying the amount of resistance the 5 volts flows through, the amount of time the monostable multivibrator stays in its unstable state is controlled. Accordingly, the width of the output pulse is controlled.

In one preferred embodiment, the spring centered position of joystick 15 produces a pulse width equal to the clock pulse width as indicated in FIG. 6A and FIG. 6B at 50 and 52. For this purpose, a joystick with total resistance of 100K may be at 50K in the spring-centered position.

Due to variations in each joystick, stabilization circuit 26 may comprise adjustable resistors or capacitors for adjusting/calibrating MV 13 so that the spring-centered position of joystick 15 produces a pulse output from MV 13 equal to the clock width as shown in FIG. 6A and FIG. 6B. Note that RC circuits 56 and 58 may also be utilized for stabilizing the system whereby smooth operation versus fast response time of the system may be optimized.

The output of one-shot MV 13 is delivered by conductor 16 to logic circuit 18 and by conductor 17 to logic circuit 19. Logic circuit 18 also receives the clock signal from the square wave generator 10 by conductor 21. In this embodiment, logic circuit 19 receives an inverted clock signal by conductor 22. Conductors 24 and 25 deliver the respective outputs of logic circuits 18 and 19 to a Moshexfet or other MOSFET power transistor 27 to provide power to the motor by forward and reverse power conductors 28 and 29. It will be understood that solid state devices or mechanical relays may be utilized to supply power to the motor field/armature windings, in this case permanent field magnet D.C. motor 30.

FIG. 6A, FIG. 6B, FIG. 6C, and FIG. 6D show the operation of logic circuits 18 and 19 wherein the signals vary between a high voltage level or logic one and a low voltage level or logic zero. It will be appreciated that logic circuits 18 and 19 may or may not be two separate paths but may simply be the output of a logic network which operates as described below. While logic circuits 18 and 19 may comprise standard digital logic components such as AND gates, NAND gates, NOR gates, OR gates, Exclusive OR gates, and the like, such as may be implemented with integrated circuits, other type of electronics could be utilized for effecting pulse controls including what may be considered analog pulse circuits such as tubes, discrete transistors, and the like.

Essentially, in this embodiment, if the output of MV 13 has a pulse width less than the clock pulse width, then the motor is driven in the forward direction as indicated by pulses 62 and 64 in FIG. 6C on the logic motor forward output line 24. In this case, the logic motor reverse output line 25 is zero as indicated at 68. If the output of MV 13 has a pulse width greater than the clock pulse width, then the motor is driven in the reverse direction as indicated by pulses 70, 72, and 74 on logic motor reverse output line 25. In this case, the logic motor forward output line is zero as indicated at 66.

The amount of pulse width difference between the output pulse of MV 13 and the pulse width of clock pulse 21 determines the width of the pulses on logic motor forward output line 24 and logic motor reverse output line 25, and therefore speed at which the motor 30 is driven in either the forward direction or the reverse direction.

Figure 5:
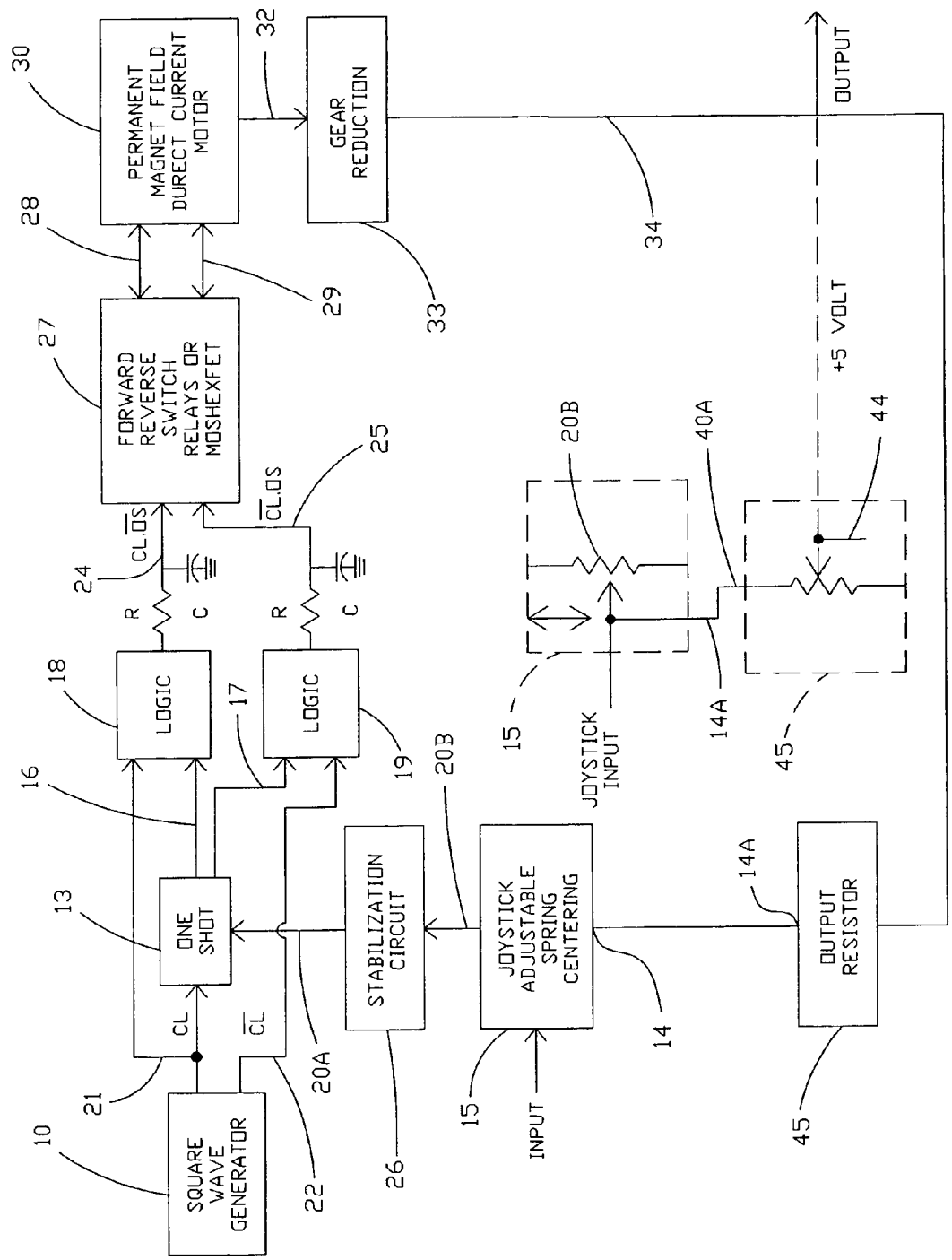
FIG. 5 is a schematic block diagram of an alternate embodiment of the invention in the form of a closed loop servo system wherein an output resistor is connected in series between the direct current motor and the joystick variable resistor shown in FIG. 4 in the open loop system embodiment of the invention and in which closed system, a potentiometer is geared to the motor such that the joystick resistance and the potentiometer resistance add up to equal the null position resistance and whereby when the joystick is moved to decrease or to increase resistance, this system causes the motor to turn and follow the position of the joystick and its resistance.

In more detail, FIG. 6A is a timing diagram of clock pulse 21 produced by square wave clock signal generator 10 used in the embodiments of the invention shown in FIG. 4 or 5 as signal amplitude (vertical) versus time. Clock generator 10 produces clock pulse 21 and an inverted clock pulse 22. Logic circuitry could also produce inverted clock pulse 22, if desired.

FIG. 6B is a timing diagram of the output signal from the one-shot MV 13, amplitude (vertical) versus time while a continuous increase in resistance from minimum to maximum is made. In one possible embodiment, the continuous increase in resistance would be produced by moving the joystick from the maximum forward position to the maximum back position. The one-shot MV 13 is triggered by the clock signal 21. In this example, the pulse duration of the output of one-shot MV 13 is controlled by the joystick resistor.

As noted previously for this example, at the spring centered position, which may be about 50K for a 100K joystick resistor, MV 13 pulse width 50 is equal to clock pulse width 52. Thus, a logic one for MV 13 and a logic one for clock 21 going into logic circuit 18 produces a logic zero or zero output for logic circuit 18 as shown in FIG. 6C which shows the output of logic circuit 18, whereby there is no motor operation. This is indicated at motor null or zero 54 on logic motor forward output line 24. Likewise, for the joystick center position, as shown in FIG. 6D which shows the output of logic circuit 18, or logic motor reverse output line 25, the combination of inverted clock signal 22 or logic zero and positive output or logic one of MV 13 also produce a logic zero output from logic circuit 19 as indicated at 60.

RC circuits 56 and 58 will essentially remove any short term spikes that might occur due to minor timing errors in the logic circuit due to the output of one shot 13 having small variations (e.g. a few microseconds) with respect to the clock pulse, thus eliminating very short pulses produced by any errors and smoothing operation when operating close to null. Smaller values for RC circuits 56 and 58 may be utilized to speed the response time of the servo if desired.

FIG. 6C is a timing diagram of the output signal from logic circuit 18, i.e., logic motor forward output line 24, based on logical combination of the signals shown in FIG. 6A and FIG. 6B. As discussed above, the amplitude which varies between one and zero is plotted versus time for the joystick resistance starting at minimum resistance and increasing constantly to a maximum. The output of logic circuit 18 is clock 21 logically combined with one-shot 13 output as described herein. It will be noted that whenever the clock pulse is at logic one and the output of one-shot 13 is at logic zero, then the output of logic circuit 18 is a logic one thereby causing motor 30 to move in the forward direction at a speed dependent upon the length of time the output of logic circuit 18 is one. Other than the condition described above where one-shot 13 output is logic zero and clock is logic one, the output of logic circuitry 18 is zero. The result is seen in FIG. 6C whereby short duration pulse 76 from one-shot 13 produce larger pulse 62 out of logic circuitry 18 as indicated at 62. When the pulse duration of one-shot 13 increases but remains less than the clock pulse width such as pulse 78, then the pulse width output of logic circuit decreases as indicated at 64. As well, it will be noted as indicated at 66 that whenever the pulse duration of multivibrator one-shot 13 is greater than the clock pulse width as indicated by, for example, pulse width 64, then the output of logic circuitry 18 will be logic zero as indicated at 66. Various combinations of logic gate circuits may be utilized to produce this specified output. As is well known, once the output is specified, as may be described by a logic truth table, then the logic circuitry for implementing the truth table can easily be designed and simplified to the minimum number of logic gates and/or for use with the desired integrated circuit logic chip(s).

FIG. 6D is the timing diagram of logic circuit 19 output signal amplitude between logic one and logic zero, i.e., logic motor reverse output line 25 versus time as joystick resistance is constantly changing as described above. As the joystick is moved backward, the resistance increases causing the one-shot MV 13 to produce a longer pulse signal. These pulses are combined by logic circuit 19 with the presence of a "not clock" or inverted clock signal 22. The output of logic circuit 19, i.e., logic motor reverse output signal line 25 shown in FIG. 6D, is at null when the clock signal 21 pulse duration shown in FIG. 6A has the same duration as one-shot MV 13 output as shown in FIG. 6B at 60. However, as the joystick is moved from null position, the time duration of the pulses on logic motor reverse output signal line 25 increase in duration as shown in FIG. 6D at 70, 72, and 74, thereby causing the motor to increase in speed in the reverse direction.

For the open loop control system of FIG. 4, it will be appreciated from the above discussion that if the joystick is held in a constant position, the motor speed will be constant. This is not the same for the closed loop control system of FIG. 5.

For the closed loop system shown in FIG. 5, an output shaft, such as a shaft associated with gear reduction 33, drives variable output resistor 45, which is shown schematically in dash. In this case, five volts may be applied to wiper 44. The variable current at 40A is applied to the input 14A of the joystick, which is the variable resistor wiper terminal.

As an example of operation of the closed loop servo system of FIG. 5, assume the joystick is at null and the motor is stopped. If the joystick 15 is moved to a position offset from null, then motor 30 will turn in that direction causing the motor to turn resistor 10 until a null occurs, i.e., when the clock signal 21 pulse width duration is the same as the one-shot MV 13 pulse width duration as indicated at 50 and 52 in the timing diagram of FIG. 6A and FIG. 6B. Once this occurs, then the motor stays in that position as long as the joystick is left in that position. Essentially, the combination of output variable resistance 45 and the variable resistance of joystick 15 are combined with motor movement occurring until there is a null. It will be appreciated that sensors of various types (temperature, position, or the like) may provide a variable resistive or variable capacitive element that combine with a variable resistive or capacitive element driven by the motor shaft to provide the servo loop of the present invention.

The relay or Moshexfet power switch 27 drives the motor 30 in response to the signals discussed above produced by logic circuits 18 and 19. For relays normally closed (n.c.), the contacts are connected to ground and for relays normally open (n.o.) the contacts are connected to a 12 volt power supply and in common therewith are connected to the motor armature, whereby for an energized relay, the contact is connected to the 12 volt power supply as is the case for the present embodiment of the invention.

Figure 7:
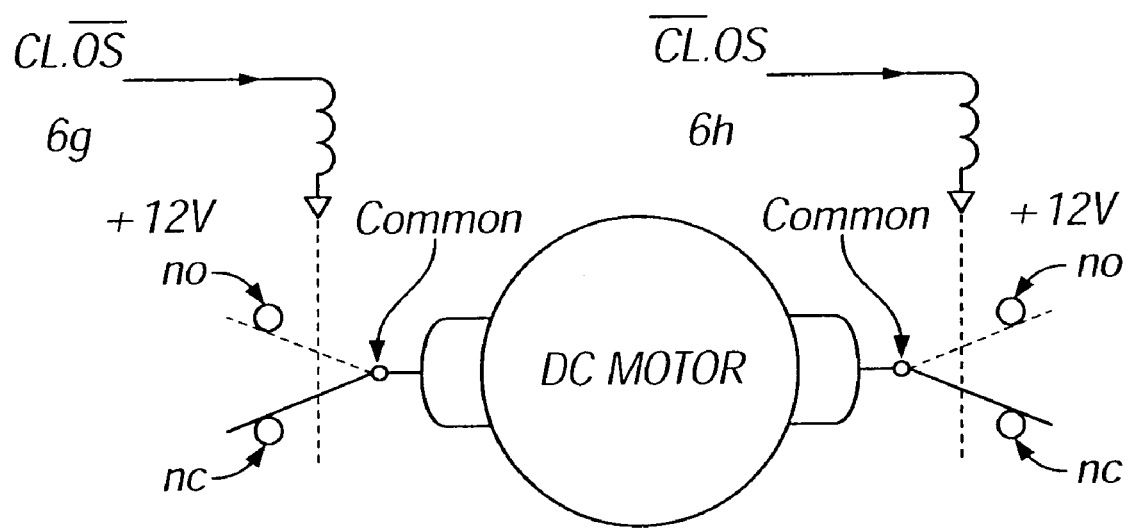
FIG. 7 is a schematic showing connections to a D.C. motor for controlling rotational direction by the current flowing into the armature of a D.C. motor where the magnetic field is produced with permanent magnets.

An example of operation of mechanical relays for either the closed loop or open loop system is shown in FIG. 7 which has two relays, one for forward motor direction and one for reverse motor direction. The forward relay is activated by a signal on line 24 and the reverse relay is operated by a pulse on reverse line 25. When the forward motor logic is activated, the relay moves so that the associated input terminal of the armature is connected to 12 volts from the n.o. terminal and the opposite terminal remains connected to ground through the n.c. connection. Likewise, when the reverse motor logic is activated, then the opposite relay switches the armature terminals connected to 12 volts and ground as compared to the forward rotation connections. Accordingly, when the joystick 15 moves forward past center position, the resulting pulses energize the relay and cause the motor 30 to turn in the forward direction. Likewise, when the joystick 15 is moved backward from the center position, the resulting pulses energize the opposite relay and causes the motor 30 to turn in the reverse direction.

In one embodiment of the present invention, motor 30 in the embodiment of the invention described herein is a permanent magnet field D.C. motor and the armature thereof is connected for power input. When the D.C. power is applied to the motor, the motor starts to turn, and when the D.C. power to the motor is reversed, the motor starts to turn in the reverse direction.

Figure 8:
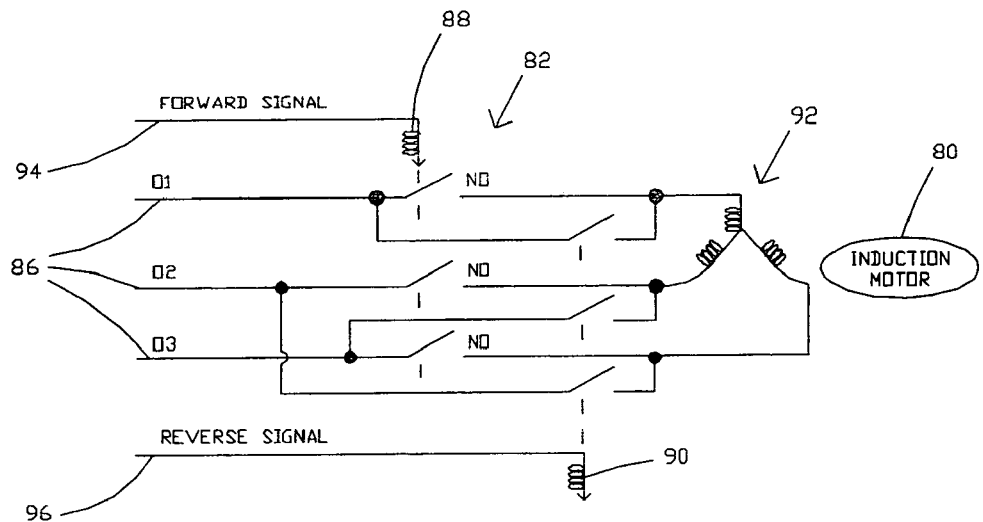
FIG. 8 is a schematic showing application of the present invention for control of the rotational direction of an A.C. motor utilizing mechanical relays.
Figure 9:
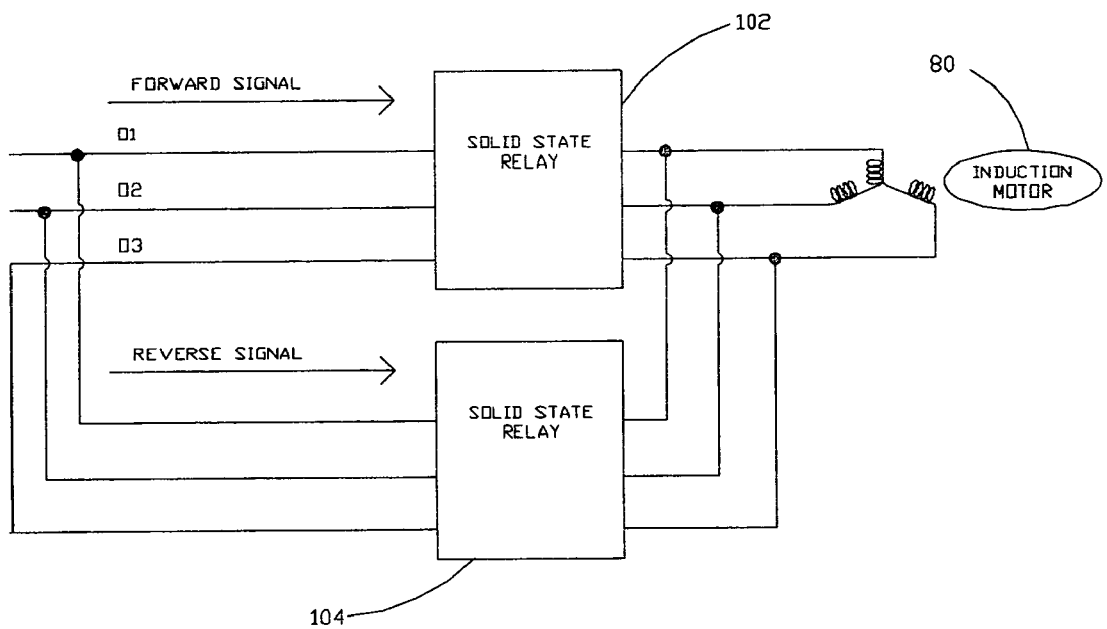
FIG. 9 is a schematic showing application of the present invention for control of the rotational direction of an A.C. motor utilizing solid state relays or other solid state power switches.

In another embodiment of the invention, an A.C. motor may be controlled such as induction motor 80 shown in FIG. 8 and FIG. 9. Induction motor 80 may be driven using either mechanical relays 82 or solid state relays or other solid switches 102 and 104. In the example of FIG. 8, A.C. power is present at phases 01, 02, and 03 at A.C. power lines 86. Forward relay 88 and reverse relay 90 are normally open so that unless activated, no current flows to motor winding 92. If a voltage is produced on forward signal line 94, this closes forward relay 88 to operate the motor in one direction. If a voltage is produced on reverse signal line 96, then reverse relay 90 applies the A.C. power line voltage to different motor windings 92 thereby reversing the A.C. motor direction.

The circuit of FIG. 9 essentially operates in the same manner as explained above except that forward relay 88 is replaced by solid state relay 102 and reverse relay 90 is replaced by reverse solid state relay 104.

In summary, the present invention is a digital motor control system which may be used for direct current (D.C.) or alternating current (A.C.) motors with a permanent magnet field, rotating magnetic field, or the like. The application of the invention may be varied for particular types of motors. For example, in a series D.C. motor, reversing the input polarity does not cause the motor to reverse direction of rotation without designing to switching the field around. In one preferred embodiment, the control system may comprise a square wave clock signal generator which drives a one-shot monostable multivibrator or other output pulse generator. In one embodiment, the output pulse duration of one-shot monostable vibrator 13 may be varied utilizing a variable resistor in the monostable vibrator timing circuit. For instance, a computer joystick as shown in FIG. 4A and FIG. 5A may comprise a spring-centered variable resistor wired such that by pulling the joystick backwards, the resistance of the resistor increases and as the joystick is moved forward, the resistance decreases to a minimum. This variable pulse duration may be digitally combined with the clock signal using digital logic such that at the joystick center position there is no output to drive the D.C. motor. Thus, as compared with the system as discussed above having 24 watts dissipation, the present invention may have a power loss of approximately only 0.016 watt around null while still retaining stable operation around the null position. In this embodiment, as the joystick is moved in a backwards direction away from the center position, then the clock and the joystick one-shot pulses may be logically combined such that a signal is generated to make the pulse duration increase so as to drive the motor faster in the reverse direction. As the joystick is moved in a forward direction away from the center position, then the pulse duration increases and this signal is logically combined with the clock signal and generates a signal with pulse duration increases to drive the motor in the forward direction. In this example, the joystick provides and represents the input, however, the input could be a sensor representation of pressure, temperature, etc., which produces a variable pulse duration. The system of the present invention is based on the use of pulse durations for driving the motor backward or forward and the absence of pulse duration to cause the motor to be stationary or nulled. The invention may be applied for servo control of both small and large motors with the same basic design and the use of relays or power transistors for driving the motor.

It is also to be understood that the foregoing descriptions of preferred embodiments of the invention have been presented for purposes of illustration and explanation and it is not intended to limit the invention to the precise forms disclosed. It is to be appreciated therefore that various structural and circuit changes, many of which are suggested herein, may be made by those skilled in the art without departing from the spirit of the invention.

What is claimed is:

1. A control system operable for controlling a direction and speed of an electric motor, comprising:
   a clock pulse generator to produce clock pulses of constant width and at a constant repetition rate;
   a variable duration pulse generator to produce output pulses which are synchronized with said clock pulses;
   a pulse duration control for controlling said variable duration pulse generator to thereby vary a duration of said output pulses;
   a logic control operable for producing control signals which control forward and reverse rotational direction and speed of said motor; and
   a power switch network which receives said control signals for interfacing with said motor, said power switch network producing power pulses for application to said motor wherein said power pulses comprise a constant positive voltage or a constant negative voltage when applying power to said motor, said power pulses comprising a power pulse duration which varies with said duration of said output pulses.

2. The control system of claim 1 wherein said system comprises an open loop control system.

3. The control system of claim 1 wherein said system comprises a closed loop control system.

4. The control system of claim 3 further comprising a shaft rotatable by said motor and variable output element responsive to a rotational position of said shaft, said variable output element providing feedback to said pulse duration control to control said rotational position of said shaft.

5. The control system of claim 1 wherein said pulse duration control comprises a spring-loaded joystick such that movement in one direction varies motor speed in a forward direction and movement of said joystick in the opposite direction controls motor speed in the reverse direction.

6. The control system of claim 1 wherein said motor is a D.C. motor.

7. The control system of claim 1 wherein said motor is an A.G. motor comprising a plurality of phases, and wherein said power switch network connects to said plurality of phases.

8. A method for controlling direction and speed of an electric motor, comprising:
   producing a plurality of clock pulses of constant duration and at a constant repetition rate;
   controlling a duration of a plurality of pulse width modulated output pulses; and
   producing control signals to control said direction and speed in response to a comparison of said constant duration of a respective of said plurality of clock pulses and said duration of a corresponding of said plurality of pulse width modulated output pulses.

9. The method of claim 8 further comprising producing a first direction control signal for rotation of said motor in a first rotational direction when a respective of said pulse width modulated output pulses has a shorter duration than said clock pulse.

10. The method of claim 9 further comprising producing a second direction control signal for rotation of said motor in a second rotational direction opposite to said first rotational direction when a respective of said pulse width modulated output pulses has a longer duration than said clock pulse.

11. The method of claim 9 further comprising providing that said motor does not rotate when said duration of said clock pulse is equal or substantially equal to a duration of a respective of said pulse width modulated output pulses.

12. The method of claim 9 further comprising providing that a magnitude of difference between said duration of said clock pulse and said duration of a respective of pulse width modulated output pulses controls said motor speed.

13. The method of claim 9 further comprising applying said control signals to solid state or mechanical relays for controlling at least one of a D.C. electric motor or an A.G. electric motor.

14. A control system operable for controlling a direction and speed of an electric motor, said electric motor comprising one or more windings, comprising:
   a variable control element;
   a logic control circuit responsive to said variable control element operable for producing control signals which control forward and reverse rotational direction and speed of said electric motor;
   an electric power supply to supply electric power to said electric motor; and
   a plurality of power switches changeable between a first configuration and a second configuration and a third configuration as controlled by said logic control circuit, said first configuration of said power switches connecting said electric power to said one or more windings so said electric motor rotates in a forward direction, said second configuration disconnecting said electric power from said one or more windings, and said third configuration of said power switches connecting said electric power to said one or more windings so that said electric motor rotates in a reverse direction, whereby said electric motor is responsive to changes in said variable control element to control direction of said electric motor.

15. The control system of claim 14 wherein said logic system is operable for controlling a rotational speed of said electric motor in said forward direction or said reverse direction by controlling a time duration in which said plurality of power switches are in said first configuration or said second configuration or said third configuration.

16. The control system of claim 14 wherein said control system comprises an open loop control system.

17. The control system of claim 14 wherein said control system comprises a closed loop control system wherein an error signal is produced as a result of width modulated pulses applied to said electric motor.

18. The control system of claim 16 further comprising a shaft rotatable by said motor and a variable output element variable in response to a rotational position of said shaft, said logic control being responsive to said variable control element and said variable output element to control a rotational position of said motor shaft.

19. The control system of claim 14 wherein said plurality of power switches comprise at least one of solid state relays or MOSFET switches.

20. The control system of claim 14 wherein said one or more windings comprise one or more windings of a D.C. electric motor.

21. The control system of claim 14 wherein said one or more windings comprise one or more windings of an A.C. electric motor and wherein said plurality of power switches network connect to said plurality of windings.

\* \* \* \* \*

UNITED STATES PATENT AND TRADEMARK OFFICE
CERTIFICATE OF CORRECTION

PATENT NO.         : 7,421,193 B2                                        Page 1 of 1
APPLICATION NO. : 11/168791
DATED              : September 2, 2008
INVENTOR(S)        : Herbert S. Kobayashi It is certified that error appears in the above-identified patent and that said Letters Patent is hereby corrected as shown below:

Column 12, Line 46, Claim 7, delete "A.G." and replace with --A.C.--.

Column 13, Line 13, Claim 13, delete "A.G." and replace with --A.C.--.

Signed and Sealed this

Sixth Day of October, 2009

David J. Kappos
*Director of the United States Patent and Trademark Office*